United States Patent
Wilson

(10) Patent No.: US 7,206,953 B1
(45) Date of Patent: Apr. 17, 2007

(54) ASYNCHRONOUS FAULT-TOLERANT ENCLOSURE SERVICES INTERFACE

(75) Inventor: Martin Lee Wilson, Sanford, FL (US)

(73) Assignee: Adaptec, Inc., Milpitas, CA (US)

( * ) Notice: Subject to any disclaimer, the term of this patent is extended or adjusted under 35 U.S.C. 154(b) by 887 days.

(21) Appl. No.: 10/022,040

(22) Filed: Dec. 17, 2001

(51) Int. Cl.
G06F 11/00 (2006.01)

(52) U.S. Cl. ............. 713/324; 713/320; 713/321; 713/322; 713/323; 714/6; 714/23; 711/114

(58) Field of Classification Search ............ 713/1, 713/2, 320–324; 709/223, 222, 220, 208; 711/112, 114; 710/15, 74, 313; 361/685; 714/6, 23

See application file for complete search history.

(56) References Cited

U.S. PATENT DOCUMENTS

| | | | |
|---|---|---|---|
| 5,216,579 A * | 6/1993 | Basara et al. ............. 361/683 |
| 5,717,870 A | 2/1998 | Dobson | |
| 5,854,904 A * | 12/1998 | Brown ............. 710/100 |
| 6,101,544 A | 8/2000 | Beebe et al. | |
| 6,115,771 A | 9/2000 | Born | |
| 6,192,481 B1 | 2/2001 | Deenadhayalan et al. | |
| 6,225,708 B1 * | 5/2001 | Furukawa et al. ........... 307/66 |
| 6,260,079 B1 | 7/2001 | White | |
| 6,408,334 B1 * | 6/2002 | Bassman et al. ............. 709/223 |
| 6,483,204 B2 * | 11/2002 | Hanaki ................. 307/23 |
| 6,785,827 B2 * | 8/2004 | Layton et al. ............. 713/300 |
| 6,959,399 B2 * | 10/2005 | King et al. ............. 714/6 |
| 2003/0023885 A1 * | 1/2003 | Potter et al. ............. 713/300 |
| 2003/0037150 A1 * | 2/2003 | Nakagawa .............. 709/229 |
| 2003/0088655 A1 * | 5/2003 | Leigh et al. ............. 709/223 |

* cited by examiner

*Primary Examiner*—Abdelmoniem Elamin
(74) *Attorney, Agent, or Firm*—Enrique J. Mora

(57) ABSTRACT

The present invention provides method, interface and computer-readable medium for enabling enclosure services in a computer system including a multi-device enclosure generally remote from a host bus adapter. The method provides a communications port between the multi-device enclosure and the host bus adapter. The method further provides a plurality of slots for removably receiving respective devices in the enclosure, with at least one of the devices comprising an Advanced Technology Attachment (ATA)-accessible device, and respective transceivers for asynchronously interconnecting the enclosure processor and the host bus adapter through the communications port. The method allows configuring the processor to asynchronously notify the host bus adaptor of the status of any given device of the enclosure upon the occurrence of predefined device events, with at least one of the events being selected from the group consisting of device insertion, device withdrawal, and malfunction indications regarding any of the devices of the multi-device enclosure.

18 Claims, 4 Drawing Sheets

ASYNCHRONOUS FAULT-TOLERANT ENCLOSURE SERVICES INTERFACE

BACKGROUND OF THE INVENTION

The present invention is generally related to computer systems, and, more particularly, the present invention is related to bus interface techniques that enable asynchronous enclosure services between an enclosure processor and a host bus adapter.

Known bus and protocol interface techniques of most common interfaces for relatively small computer systems, such as ATA (Advanced Technology Attachment, also known in the art as Integrated Development Environment (IDE) interface), SATA (Serial Advanced Technology Attachment), UATA (Ultra ATA), etc., have no means for supporting an enclosure processor.

More particularly, disk drive enclosure service processors are known to use various standard protocols that unfortunately fail to address the needs of inexpensive interfaces such as ATA. For example, in SCSI Accessed Fault-Tolerant Enclosures (SAF-TE), the enclosure processor is just another device attached to the SCSI bus and may use a SAF-TE protocol that synchronously polls the enclosure processor at a predefined rate, e.g., every two seconds. Performing synchronous polling in an ATA interface regardless of the condition of the devices in the enclosure could compromise the performance of the Host Bus Adapter (HBA) since such polling typically interrupts operation of the Central Processing Unit (CPU) with every character arrival or transmittal. Thus, interrupt overhead of a synchronous polling technique could detrimentally affect the performance of the HBA in the ATA interface.

In SCSI Enclosure Services (SES), an elaborate command set, mainly used in FIBRE-based interfaces, requires the enclosure processor to be coupled to one or more of the Fibre drives. The command set relies on special diagnostics commands to be sent through one or more of the drives, which in turn relay such commands to the enclosure processor. In an ATA interface it would be impractical to sacrifice one or more of the drives for providing communications with the enclosure processor. In fact, the ATA interface command protocol does not support any form of enclosure services.

In view of the foregoing discussion, it would be desirable to provide reliable and low-cost interface techniques between the enclosure processor and the HBA to carry out Enclosure Services in inexpensive and widely used interfaces for small computer systems.

BRIEF SUMMARY OF THE INVENTION

Generally, the present invention fulfills the foregoing needs by providing in one aspect thereof a method for enabling enclosure services in a computer system including a multi-device enclosure generally remote from a host bus adapter. The method provides a communications port between the multi-device enclosure and the host bus adapter. The method further provides a plurality of slots for removably receiving respective devices in the enclosure, with at least one of the devices comprising an Advanced Technology Attachment (ATA)-accessible device, and respective transceivers for asynchronously interconnecting the enclosure processor and the host bus adapter through the communications port. The method allows configuring the processor to asynchronously notify the host bus adaptor of the status of any given device of the enclosure upon the occurrence of predefined device events, with at least one of the events being selected from the group consisting of device insertion, device withdrawal, and malfunction indications regarding any of the devices of the multi-device enclosure.

The present invention further fulfills the foregoing needs by providing in another aspect thereof, a computer bus interface for enabling enclosure services in a computer system including a multi-device enclosure generally remote from a host bus adapter and including a plurality of slots for removably receiving respective devices in the enclosure. The interface includes a communications port between the multi-device enclosure and the host bus adapter. At least one of the devices of the multi-device enclosure comprises an Advanced Technology Attachment (ATA)-accessible device. The interface further includes a pair of transceivers for asynchronously interconnecting the enclosure processor and the host bus adapter through the communications port. Memory is provided for storing a plurality of instructions for configuring the processor to asynchronously notify the host bus adaptor of the status of any given device of the enclosure upon the occurrence of predefined device events, with at least one of the events being selected from the group consisting of device insertion, device withdrawal, and malfunction indications regarding any of the devices of the multi-device enclosure.

In yet another aspect of the invention, a computer-readable medium including instructions for causing an interface to enable enclosure services in a computer system is provided. The multi-device enclosure includes a plurality of slots for removably receiving respective devices therein, with at least one of the devices comprising an Advanced Technology Attachment (ATA)-accessible device. The computer-readable medium comprises instructions for:

configuring respective transceivers for asynchronously interconnecting the enclosure processor and a host bus adapter through a communications port; and configuring the processor to asynchronously notify the host bus adaptor of the status of any given device of the enclosure upon the occurrence of predefined operational events, with at least one of the events being selected from the group consisting of device insertion, device withdrawal, and malfunction indications regarding any of the devices of the multi-device enclosure.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION GLOSSARY

| | |
|---|---|
| FW | Firmware |
| HBA | Host Bus Adapter, an I/O adapter that, for example, connects a host I/O bus to the storage memory system of the host |
| HOT PLUG | The process of adding or removing a device from a bus while transactions involving other devices are occurring over the bus |

-continued

| | |
|---|---|
| JBOD | Just a Bunch Of Disks - Used to refer to non-RAID components. |
| RAID | Redundant Array of Independent Disks, a collection of two or more disks working together as a single independent disk drive |
| RX | Receiver |
| SCSI | Small Computer System Interface, a standard that defines connections between computers and peripheral devices |
| SES | SCSI Enclosure Services, a standard for SCSI access to services within an enclosure including one or more SCSI devices, such as disk drives, power supplies, cooling elements, temperature sensors, etc. |
| SPES | Serial Port Enclosure Services |
| TX | Transmitter |
| XOR | An exclusive OR (XOR) logic operation is true if only one of the inputs is true, but not both. |

Overview

Exemplary HBA Functional Abilities

Query SPES Processor for version and configuration information

Set SPES Processor component states

Query enclosure present component status

Query enclosure present power supply status

Query the present temperature of the enclosure

Provide Active Cable Continuity checking (PING)

Exemplary SPES Processor Functional Abilities

Asynchronously notify HBA when any device has been inserted or removed from the back plane slots Asynchronously notify HBA when one or more power supplies are out of spec or have failed Asynchronously notify HBA when one or more cooling fans are out of spec or have failed Asynchronously notify the HBA when any enclosure temperature is out of range.

Optionally provide Active Cable Continuity checking (PING)

Figure 1:
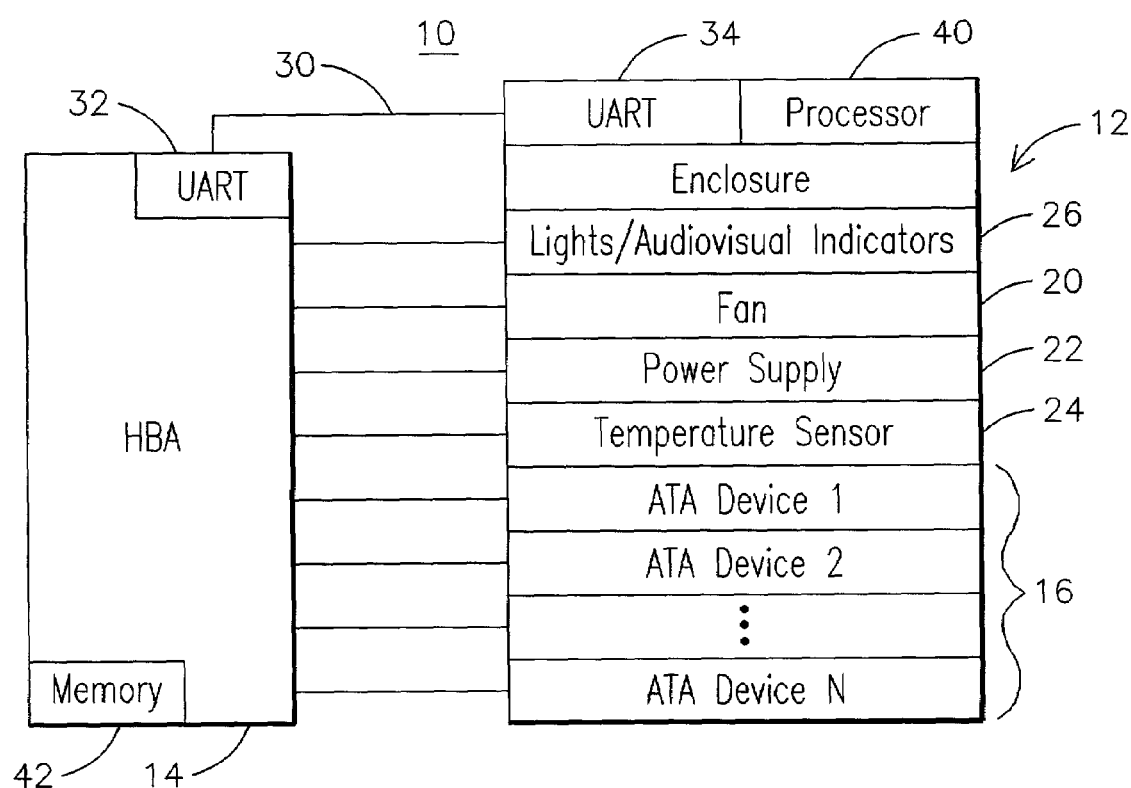
FIG. 1 illustrates a block diagram representation of a computer bus interface for enabling enclosure services in a computer system including a multi-device enclosure including a plurality of slots for removably receiving respective devices, such as one or more ATA-based devices.

FIG. 1 illustrates a block diagram representation of a computer bus interface 10 for enabling enclosure services in a computer system including a multi-device enclosure 12 generally remote from a host bus adapter 14 and including a plurality of slots 16 for removably receiving respective devices, such as one or more ATA-based devices, represented by devices 1 through n, such as disk drives or any other computer peripheral equipment. The enclosure 12 may further include additional devices that may vary depending on the specific requirements of any given application. Examples of such additional devices may include a fan 20, a power supply 22, a temperature sensor 24, lights, or audiovisual indicators 26 for communicating status information of the enclosure to a user.

A communications port 30 is provided between the multi-device enclosure and the host bus adapter. A pair of transceivers 32 and 34 is provided for asynchronously interconnecting an enclosure processor 40 and the host bus adapter 14 through the communications port. In one exemplary embodiment, communications port 30 comprises a serial communications port and each transceiver comprises a Universal Asynchronous Receiver Transmitter (UART). A memory device 42 includes a plurality of instructions for configuring the processor 40 to asynchronously notify the host bus adaptor of the status of any given device of the enclosure upon the occurrence of predefined device events. Examples of the events may include device insertion, device withdrawal, and malfunction indications regarding any of the devices of the multi-device enclosure. Memory 42 further includes instructions for configuring the host bus adapter to control, through the communications port, the enclosure processor to set respective device states of the multi-device enclosure. The instructions in memory 42 also allow configuring the host bus adapter to generate a set of queries transmitted through the communications port and requiring response from the enclosure processor regarding the status of respective devices of the multi-device enclosure. As used herein the expression "enclosure services" refers to techniques for sensing and monitoring the physical and/or operational conditions of devices within an enclosure as well as allowing access to status reporting and configuration features of the enclosure, such as indicator LEDs of the enclosure, cooling equipment, insertion and removal of devices, etc. It will be understood that the term "enclosure" should not be construed narrowly since the concepts of the present invention are not dependent in any way on the existence of any remote physical enclosure. For example, it is contemplated that in some applications both the enclosure devices and the host bus adaptor could be integrated within a common chassis of a small computer, and thus the concepts of the present invention may be advantageously applied regardless of the existence of any separate physical enclosure.

Exemplary Hardware Requirements

As suggested above, in one exemplary embodiment, an RS-232C/422 serial interface is used for communication between the SPES processor and the HBA. It will be appreciated by those skilled in the art that other types of serial interfaces, e.g., Firewire (IEEE 1394) interface, parallel interface, etc., could have been used.

Character spacing of about 1 ms per character is employed in one exemplary embodiment, this corresponds to a baud rate of about 9600 bps. Some of the factors for choosing this character spacing are as follows:

Presently, small 8-bit SPES processors are typically not very fast (about 800 ns per instruction) and need time to perform the required XOR checksum functions of the protocol. This character spacing allows about 1 ms of processing time between each character.

HBA adapter performance could otherwise be impacted with serial interrupts and task switches.

Exemplary Physical Interconnect Requirements

In one exemplary embodiment the interconnect requirements are predefined to meet the applicable ATA interface requirements, such as ATA and Serial ATA type hot-plug enclosures. Assuming the user was to just randomly connect the disk cable to the HBA disk channels, the HBA firmware may not be able to map which enclosure slot is connected to which HBA channel.

For example, in a four slot ATA enclosure, the four disk drive cables should be connected to the HBA in the following manner:

Cable for slot 0 would be connected to Channel 0 of the HBA

Cable for slot 1 would be connected to Channel 1 of the HBA

Cable for slot 2 would be connected to Channel 2 of the HBA

Cable for slot 3 would be connected to Channel 3 of the HBA

The HBA and SPES processor assume this one-to-one interconnect mapping scheme. It will be appreciated by those skilled in the art, that such a mapping scheme may vary in accordance with the specific requirements of the interface being supported.

Exemplary Control Protocol

Active Cable Continuity

Active Cable Continuity is used to verify the connection between the HBA and the SPES processor. In one exemplary embodiment, a PING character is sent periodically, e.g., once every 10 seconds, provided that a SPES transmission frame is not being transported. The sender sends the PING character and the recipient returns the invert (NOT PING) of that PING character. In this exemplary embodiment, the PING character is defined as 0x2B and the NOT PING character is defined as its binary invert 0xD4.

The HBA is configured to support initiating the PING cycle with the SPES Processor and to return the NOT PING response. Optionally, the SPES Processor may also initiate the PING cycle with the HBA responding with the NOT PING response.

Exemplary SPES Transmission Frame

Table 1 below illustrates an exemplary encapsulation of SPES command and data payloads using a straightforward data format using 8-bit ASCII characters.

TABLE 1

| Bit Byte | 7 | 6 | 5 | 4 | 3 | 2 | 1 | 0 |
|---|---|---|---|---|---|---|---|---|
| 0 | Start Of Header-SOH (0x01) | | | | | | | |
| 1 | Total TX byte count | | | | | | | |
| 2~n−3 | SPES command and page payload | | | | | | | |
| n−2 | XOR checksum LO | | | | | | | |
| n−1 | XOR checksum HI | | | | | | | |
| n | End Of Transmission-EOT (0x04) | | | | | | | |

Start of Header (SOH)

ASCII character (0x01) marks the beginning of each serial transfer packet. This is the first byte sent to the recipient.

Total TX Byte Count

This count is the number of bytes to be received starting from byte 2 through the EOT byte. In one exemplary embodiment, this is the first byte to be part of the XOR checksum.

SPES Command and Page Data

The SPES command and page data may be built by either the HBA or the SPES Processor. In one exemplary embodiment, this is the last byte of the page payload data and is the last byte of XOR checksum protected data.

XOR Checksum HI and LO

To ensure adequate protection of the page payloads, it was felt that a 16-bit CRC could appropriately protect the data. However, such an implementation often requires multiplication instructions or a lookup table and, thus, could become somewhat burdensome, or expensive, for 8-bit microprocessors typically used in enclosures. Thus, in one exemplary embodiment, the serial data stream is protected using an uncomplicated but effective scheme that can be implemented by even small 8-bit microprocessors. The proposed scheme is believed to more than adequate detect any errors in the transmitted SPES transmission frame.

As suggested above, the first byte of data undergoing a logical XOR operation is the TX byte count and the last byte of the page payload. In one exemplary embodiment, a 16-bit XOR checksum is "produced" by the TX driver in the following manner:

A 16-bit result value is initialized to zero when the first protected byte is about to be transmitted. As each byte is transmitted, the 16-bit XOR checksum value is rotated one bit position to the left. When the rotation is complete, the previous high order bit [15] would appear at bit position [0]. The transmitted byte then undergoes a XOR operation with the low order byte [7:0] of the 16-bit result value. This continues until all protected bytes have been transmitted. The produced two-byte XOR checksum result is inverted and then transmitted. First the lower byte [7:0] and then the high order byte [15:8].

Similarly, a 16-bit XOR checksum is "verified" by the RX driver in the following manner:

When the first byte of protected data arrives, the upper byte of the XOR checksum is set to zero and the lower order byte is set equal to the first byte of protected data. As each additional byte arrives, the 16-bit XOR checksum value is rotated one bit position to the left. When the rotation is complete, the previous high order bit [15] shall now appear at bit position [0]. The newly arrived byte then undergoes a XOR operation with the low order byte [7:0] of the XOR checksum.

When both bytes of the senders transmitted XOR value are received, these values undergo a XOR operation with the receiver calculated values and should produce a final value of 65,535 if the transmission is valid.

End of Transmission (EOT)

The ASCII 0x04 character marks the end of SPES transmission frame. Once the EOT has been transmitted, the recipient is given an appropriate period of time (e.g., two seconds) to return an ASCII ACK (0x06) or NAK (0x15) character response to the sender.

Exemplary SPES Command Frame

Table 2 below lists exemplary SPES page payloads encapsulated with a Status and Command byte forming a SPES command frame. All commands generally require a SPES page payload even if it is only the page identifier.

TABLE 2

| Bit Byte | 7 | 6 | 5 | 4 | 3 | 2 | 1 | 0 |
|---|---|---|---|---|---|---|---|---|
| 0 | SPES Status | | | | | | | |
| 1 | SPES Command | | | | | | | |
| 2~n | SPES page payload | | | | | | | |

SPES Status

This is the completion status of any SPES command. Typically, the recipient fills in this status but in cases of transmission failures the TX driver of the sender will fill it in with a TX_type error status.

SPES_COMPLETED (0x00)

This indicates to the sender that the recipient received a valid command and it was successfully completed. The Page identifier within the payload indicates which page was successfully updated. Actual page data may or not be attached depending on the original command sent to the recipient.

SPES_ERROR (0x01)

SPES command completed with unknown error. For ease of debugging, the recipient should return the entire page data payload back to the sender.

SPES_PARM_ERROR (0x02)

The attached page payload has one or more bytes that are incorrect. The page identifier within the payload is valid. For ease of debugging, the recipient should return the entire page data payload back to the sender.

SPES_NOT_SUPPPORTED (0x03)

This indicates to the sender that the SPES command or page is not supported. For ease of debugging, the recipient should return the entire page data payload back to the sender.

SPES_BUSY (0x04)

The recipient received the valid SPES command but was unable to process at this time. The sender needs to retry again later. The sender should wait a suitable period of time (e.g., five seconds) before retrying the SPES command that caused this SPES_BUSY status to be returned.

SPES_TX_TIMEOUT(0x80)

The SPES serial transmission frame was sent but the required serial ACK/NAK response was not received from the recipient within a suitable time period, e.g., about two seconds, after sending the EOT character of the SPES frame. In this case the senders' own TX driver returned the entire SPES command and payload to the senders completion queue.

SPES_TX_NAK(0x81)

This error status indicates that the recipient received the SPES transmission frame and responded with a NAK response. This error may mean the XOR checksum was incorrect. In this error case the senders' own TX driver returned the entire SPES command and payload to the senders completion queue. Optionally, the TX driver is allowed to do one retry before returning this error.

Exemplary SPES Page Commands

The command byte instructs the recipient how to handle the request.

HBA Request for SPES Page Data (0x00)

The HBA is requesting the SPES Processor to return specific SPES page data. Only the page identifier is part of the payload. The SPES Processor should respond within an appropriate waiting period, e.g., about five seconds, by returning the requested page and status using SPES command "SPES Acknowledgement (0xFF)".

HBA Update of SPES page data (0X01)

The HBA is requesting the SPES Processor to update the provided SPES page. Page identifier and data is part of the payload. The recipient should update internal page data and act upon on new page data. The SPES Processor should return SPES Status using SPES command "SPES Acknowledgement (0xFF)" within an appropriate waiting period, e.g., about five seconds.

SPES Processor Notify (0X82)

The SPES Processor is notifying the HBA that the attached page has changed. The HBA should return the SPES Status using SPES command "HBA ACKNOWL-EDGEMENT (0X7F)" within an appropriate waiting period, e.g., about five seconds.

SPES Acknowledgement (0xFF)

The SPES Processor sends completion status of a previous request. The Page Code Identifier indicates the page being acknowledged and SPES status is the completion status. It is not necessary to return the page data as part of the payload unless the original SPES command required its return.

HBA Acknowledgement (0X7F)

The HBA sends completion status of a previous SPES Processor request. The Page Code Identifier and the SPES command status must be returned. It is not necessary to return the page data as part of the payload unless the original SPES command required its return.

Exemplary SPES Pages

This section defines each of the SPES pages supported by this interface. Each page has a unique Page Code Identifier.

Read Enclosure Configuration Page (0X00)

As shown in Table 3 below, this page provides the HBA a means to query the SPES Processor features and manufacture information. The HBA will not allow unsolicited returns of this page by the SPES Processor. The SPES Processor will receive a negative acknowledgment frame and shall not consider this response from the HBA as a fatal condition.

TABLE 3

| Bit Byte | 7 | 6 | 5 | 4 | 3 | 2 | 1 | 0 |
|---|---|---|---|---|---|---|---|---|
| 0 | Page Code Identifier (0x00) | | | | | | | |
| 1 | SPES spec major version | | | | SPES spec minor version | | | |
| 2 | SPES device FW major major version | | | | SPES device FW minor version | | | |
| 3~10 | 8 byte SPES Device Manufacture Name in ASCII | | | | | | | |
| 11~26 | 16 byte Model Name in ASCII | | | | | | | |
| 27~42 | 16 byte SPIES device serial number | | | | | | | |
| 43 | Number of device slots | | | | | | | |
| 44 | Celsius | | | | Number of temperature sensors | | | |
| 45 | Number of Fans | | | | | | | |
| 46 | Number of Power supplies | | | | | | | |

Byte 0: This byte is generally set to zero.

Byte 1: This byte indicates to what level of the SPES spec the SPES device will adhere to. In one exemplary embodiment, the byte is divided into two 4-bit fields. For example, the upper 4 bits may represent the MAJOR version number and the lower 4 bits may represent the MINOR version. Valid range of each 4-bit field may be 0x0–0xF.

EXAMPLE 1

If the version was version 1.4 then bits [7:4] would be set to 0x1 and bits [3:0] would be set to 0x4 which results in the byte being equal to 0x14.

EXAMPLE 2

If the version was version 10.6 then the bits [7:4] would be set to 0xA and bits [3:0] would be set to 0x6 which results in the byte being equal to 0xA6.

Byte 2: This indicates the FW version level of the SPES device. The byte is divided into two 4-bit fields. As suggested above, the upper 4 bits may be the MAJOR version number and the lower 4 bits may be the MINOR version.

Valid range of each 4-bit field shall be 0x0–0xF. This byte has the same format as byte 1 above.

Byte 3~10: Eight bytes of the SPES processor Manufacturer's name. The name may be in a printable ASCII format. Unused bytes may be set to an ASCII space (0x20).

Byte 11~26: Sixteen bytes of the SPES processor's Model name. The name may be in a printable ASCII format. Unused bytes may be set to an ASCII space (0x20).

Byte 27~42: Sixteen bytes of the SPES processor's Serial Number. The serial number string may be in a printable ASCII format. Unused bytes may be set to an ASCII space (0x20).

Byte 43: The number of device slots in the enclosure. In one exemplary embodiment, valid range shall be from 1–255. All enclosures should have at least one device slot.

Byte 44: Bits [6:0] indicates the number of temperature sensors that are reportable to the HBA. By way of example, valid range may be 0–127. The Celsius flag shall be set to indicate that the temperature fields returned by the processor are in Celsius. If this flag is cleared, then the temperatures returned will be in Fahrenheit. A count of zero shall mean the enclosure has no reportable temperature sensors.

Byte 45: The number of possible reportable fans within the enclosure. By way of example, valid range may be 0–255. Fans not installed and reportable shall be included in this count. A count of zero shall mean the enclosure has no reportable fans.

Byte 46: The number of possible reportable power supplies within the enclosure. By way of example, valid range may be 0–255. Power supplies no installed and reportable must be included in this count. A count of zero shall mean the enclosure has not reportable power supplies.

Exemplary Enclosure Status Pages

Operational status of the enclosure components may be read by the HBA or delivered by the SPES Processor using the following Enclosure Status pages. The SPES Processor generally will not be allowed to deliver any of these pages until the HBA has performed the "HBA REQUEST FOR SPES PAGE DATA (0x00)" function and has set aside enough memory for incoming status pages. The number of status bytes available for transfer to the HBA will depend on the number of reportable components reported in the "HBA REQUEST FOR SPES PAGE DATA (0x00)". Table 4 below illustrates an exemplary Fan status page (0x01)

TABLE 4

| Bit Byte | 7 | 6 | 5 | 4 | 3 | 2 | 1 | 0 |
|---|---|---|---|---|---|---|---|---|
| 0 | | | Page Code Identifier (0x01) | | | | | |
| 1 | | | Number of status entries | | | | | |
| 2~n | | | Fan Status | | | | | |

Byte 0: Generally set to 0x01

Byte 1: Number of status entries to follow. A count of zero shall mean that the enclosure has no reportable fans.

Byte 2~n the Status of each fan:

Exemplary Valid Fan Status Values:

0x00 Fan is operational

0x01 Fan is malfunctioning

0x02 Fan is not installed

0x80 Unknown Status or Status Not Reportable

Table 5 below illustrates an exemplary Power Supply status page (0x02)

TABLE 5

| Bit Byte | 7 | 6 | 5 | 4 | 3 | 2 | 1 | 0 |
|---|---|---|---|---|---|---|---|---|
| 0 | | | Page Code Identifier (0x02) | | | | | |
| 1 | | | Number of status entries | | | | | |
| 2~n | | | Power supply Status | | | | | |

Byte 0: Generally set to 0x02

Byte 1: Number of status entries to follow. A count of zero shall mean that the enclosure has no reportable power supplies.

Byte 2~n the Status of each power supply:

Valid Power Supply Status Values:

0x00 Power supply is operational

0x01 Power supply is malfunctioning

0x02 Power supply is not installed

0x80 Unknown Status or Status Not Reportable

Table 6 Below Illustrates an Exemplary Device Slot Status (0x03)

The SPES Processor sends this frame to the HBA when the device slot status changes. The HBA does not have to poll this page but can optionally do so at anytime.

TABLE 6

| Bit Byte | 7 | 6 | 5 | 4 | 3 | 2 | 1 | 0 |
|---|---|---|---|---|---|---|---|---|
| 0 | | | Page Code Identifier (0x03) | | | | | |
| 1 | | | Slot number | | | | | |
| 2 | NC | PF | FF | PC | IDA | IFA | DF | NE |
| 3 | | IF | HS | MA | EA | RS | DR | BF |
| 4 | | | | | | | DO | DP |

Byte 0: Generally set to 0x03

Byte 1: Device slot number that is being reported by the SPES Processor or requested by the HBA. The number may be zero-based. That means the first slot within the enclosure may be selected to have a value of 0x00. By way of example, valid range may be 0–255.

Byte 2: This byte is a copy of the last one sent to the SPES processor by the HBA using the page. In one exemplary embodiment, the fields are defined as follows:

NE—No Error Flag. SET if there are no outstanding error conditions on this device slot.

DF—Device Faulty Flag. SET if this device has exhibited some hardware or data fault. This device is offline and is considered not functional.

IFA—In Failed Array Flag. SET if this device is in an array that is not recoverable and is classified as a dead array member.

IDA—In Degraded Array Flag. SET if this device is in an array that was previously fault-tolerant and has become non-fault-tolerant. Non-redundant configurations such as RAID 0 are inherently non-fault-tolerant, and should not make use of this flag.

PC—Parity Check Flag. SET if the device is in an array, which is undergoing parity check operation.

FF—Formatting Flag. SET for a slot that is currently in a low level formatting state.

PF—Predicted Fault Flag. SET if a fault prediction algorithm has determined that this device is likely to fail in the near future.

NC—Not Configured Flag. SET if a device is currently not configured as an element of an array or as a hot spare. (JBOD)

Byte 3: This byte is a copy of the last one sent to the SPES Processor by the HBA using the page. In one exemplary embodiment, the fields are defined as follows:

BF—Building Flag. SET for a slot that is currently in a building state. All members within the building array shall have this bit set. Non-redundant configurations, such as RAID 0 are inherently non-fault-tolerant, and should not make use of this flag.

DR—Device Rebuilding Flag. SET if the device is being rebuilt. Other drives in this array remain In Degraded Array State until the rebuild operation is complete. Non-redundant configurations such as RAID 0 are inherently non-fault-tolerant, and should not make use of this flag.

RS—Rebuild Stopped Flag. SET for a slot containing a device which was rebuilding, but the rebuild terminated abnormally or unsuccessfully. This flag and the Device Rebuilding (DR) flag cannot both be set for the same slot.

EA—Expanding Array Flag. SET for a slot that is currently expanding. All members in an expanding array shall have the bit set.

MA—Morphing Array Flag. SET for a slot that is currently morphing from one array type to another. All members of a morphing array shall have this bit set.

HS—Hot Spare Flag. SET if device in this slot is configured as a hot spare.

IF—Identify Flag. When SET, the SPES Processor is to flash the slots identifier signal for a suitable period of time (e.g., not less than 10 seconds and not more than 60 seconds, the identify period). This helps the user locate the device slot. If the device slot signal is being used for other purposes, then it will be temporally suspended only for the identify flash period. After the identify period is over, this bit is auto-cleared by the SPES Processor. The HBA can clear this bit early with a subsequent command.

Byte 4: This byte contains flags that indicate conditions of interest on the slot, which the SPES Processor shall report to the HBA.

DP—Device Present Flag—This flag indicates whether or not there is a physical device inserted in the device slot. This does not imply that the device is ready for access on the bus. If the bit is CLEAR, no device is inserted at this time. If the bit is SET, a device is inserted.

DO—Device Operation Flag—This flag indicates whether or not the slot is activated so that the inserted drive may be accessed on the bus. SET means "ready" and CLEAR means "not ready."

Table 7 Below Illustrates an Exemplary Page for Write Device Slot Status (0x83)

The Write Device Slot Status page is used by the HBA to inform the SPES Processor of the state of each slot and the device potentially inserted. This information is used to drive the enclosure visual and audible devices (LEDs, LCD, audible alarm, etc.) to some meaningful state, depending on the vendor's implementation of such LEDS/LCD and Alarms sub-systems.

TABLE 7

| Bit Byte | 7 | 6 | 5 | 4 | 3 | 2 | 1 | 0 |
|---|---|---|---|---|---|---|---|---|
| 0 | Page Code Identifier (0x83) | | | | | | | |
| 1 | Slot number | | | | | | | |
| 2 | NC | PF | FF | PC | IDA | IFA | DF | NE |
| 3 | | IF | HS | MA | EA | RS | DR | BF |

Byte 0: Generally set to 0x83

Byte 1: Device slot number that is being up dated by the HBA. The number may be zero-based. That means the first slot within the enclosure may have a value of 0x00. For example, valid range may be 0–255.

Byte 2: These flags are used to inform the SPES Processor as to the state of the device slot. The SPES Processor shall update visual and alarm indicators to reflect the new state of the slot. This byte shall be retained by the SPES Processor and returned as part of the above as to the definition of bits within this byte.

Byte 3: These flags are used to inform the SPES Processor as to the state of the device slot. The SPES Processor shall update visual and alarm indicators to reflect the new state of the slot. This byte shall be retained by the SPES Processor and returned as part of the page above as to the definition of bits within this byte.

Table 8 Below Illustrates an Exemplary Temperature Status Page (0x04)

TABLE 8

| Bit Byte | 7 | 6 | 5 | 4 | 3 | 2 | 1 | 0 |
|---|---|---|---|---|---|---|---|---|
| 0 | Page Code Identifier (0x04) | | | | | | | |
| 1 | Number of temperature entries | | | | | | | |
| 2~n | Present temperature reading | | | | | | | |

Byte 0: Generally set to 0x04

Byte 1: Number of entries to follow. A count of zero shall mean that the enclosure has no reportable temperature sensors.

Bytes 2~n: Each of these fields contains an unsigned integer indicating internal or external enclosure temperature at this sensor in degrees. This value, from 0 to 255, is based on a scale starting at −10 degrees. This gives an effective reportable temperature range from −10 degrees to 245 degrees. The returned value can be defined as Celsius or Fahrenheit.

Figure 2:
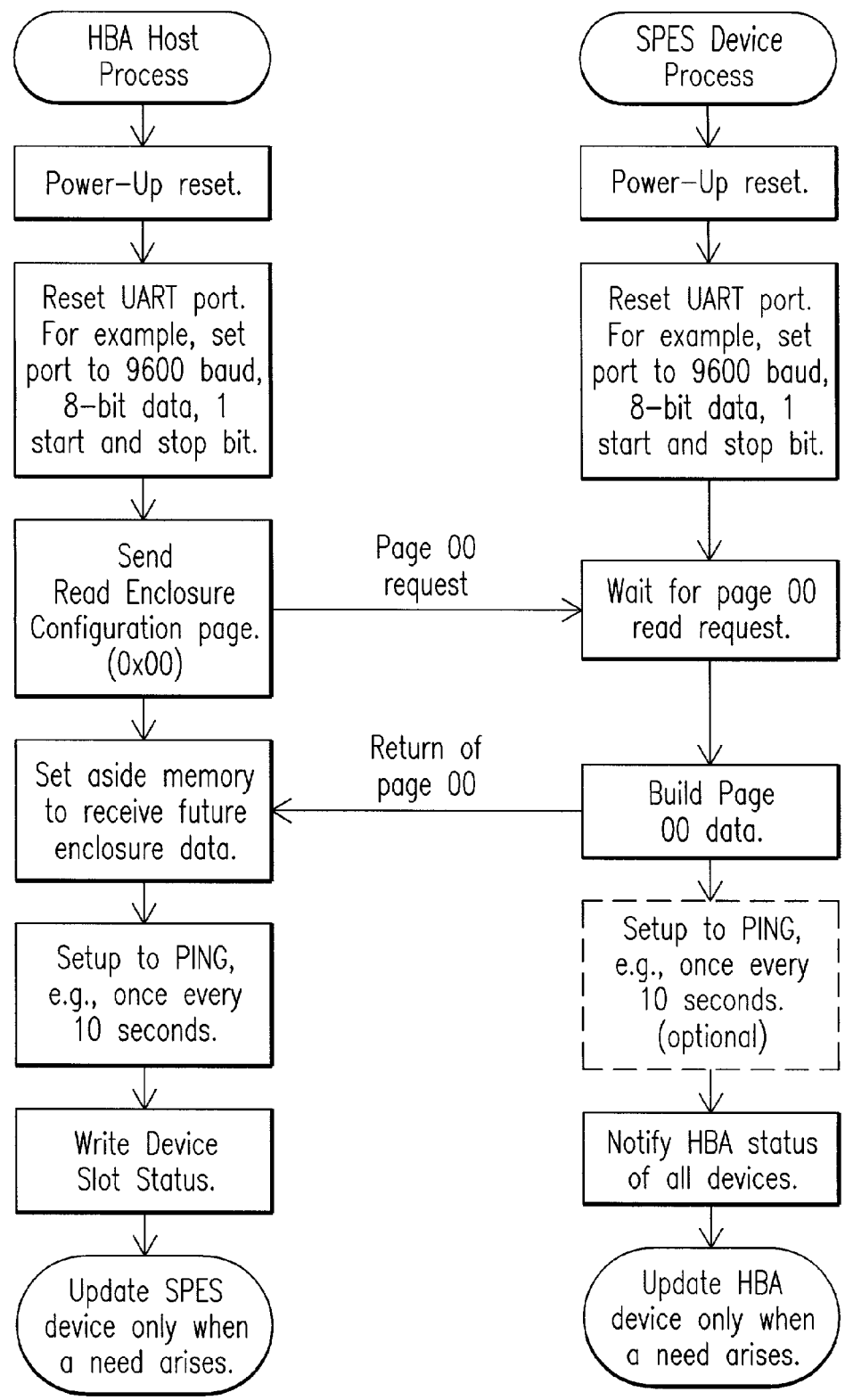
FIGS. 2–4 illustrate respective flow charts of exemplary operational interrelationships regarding the computer bus interface of FIG. 1.
Figure 3:
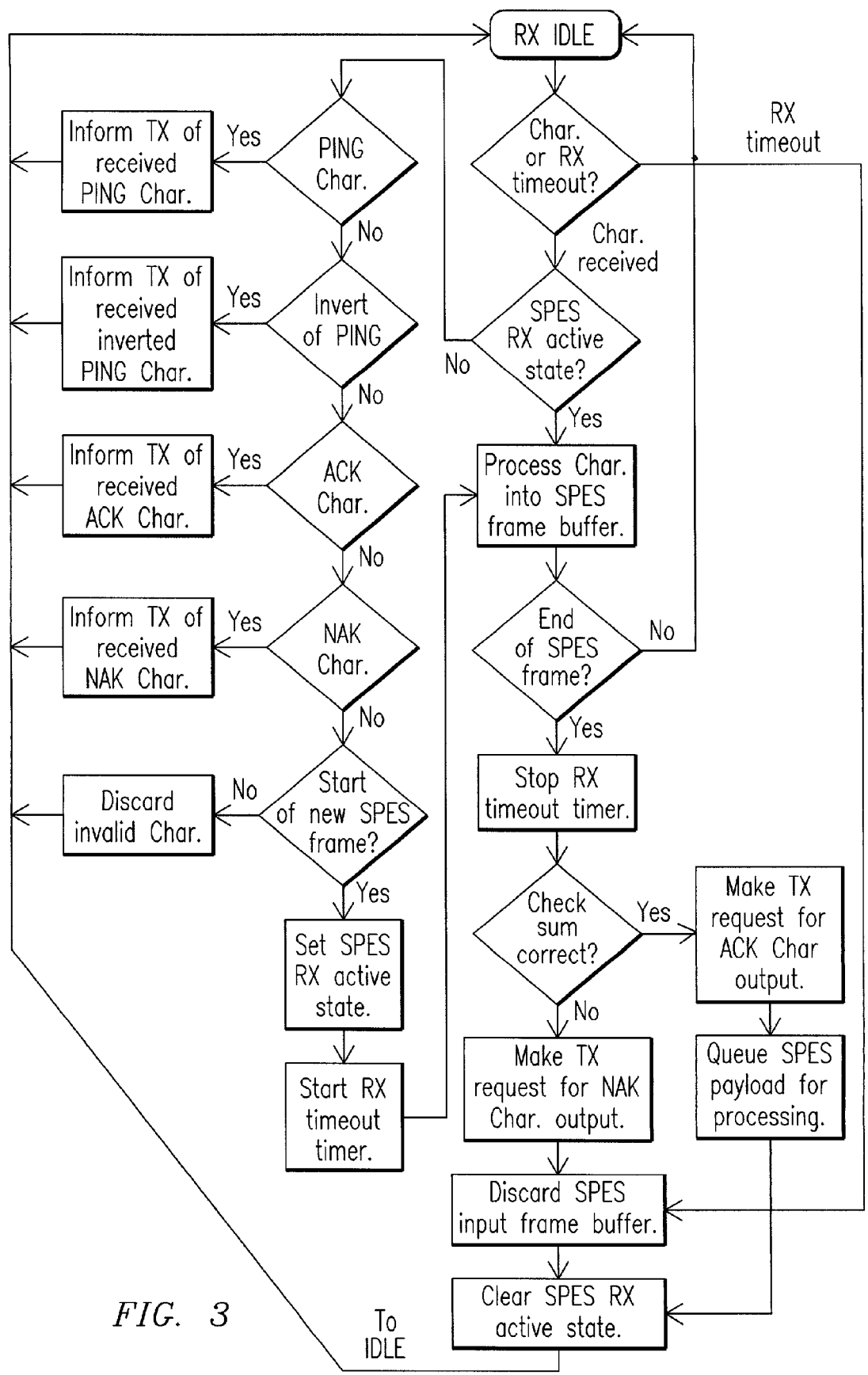
Figure 4:
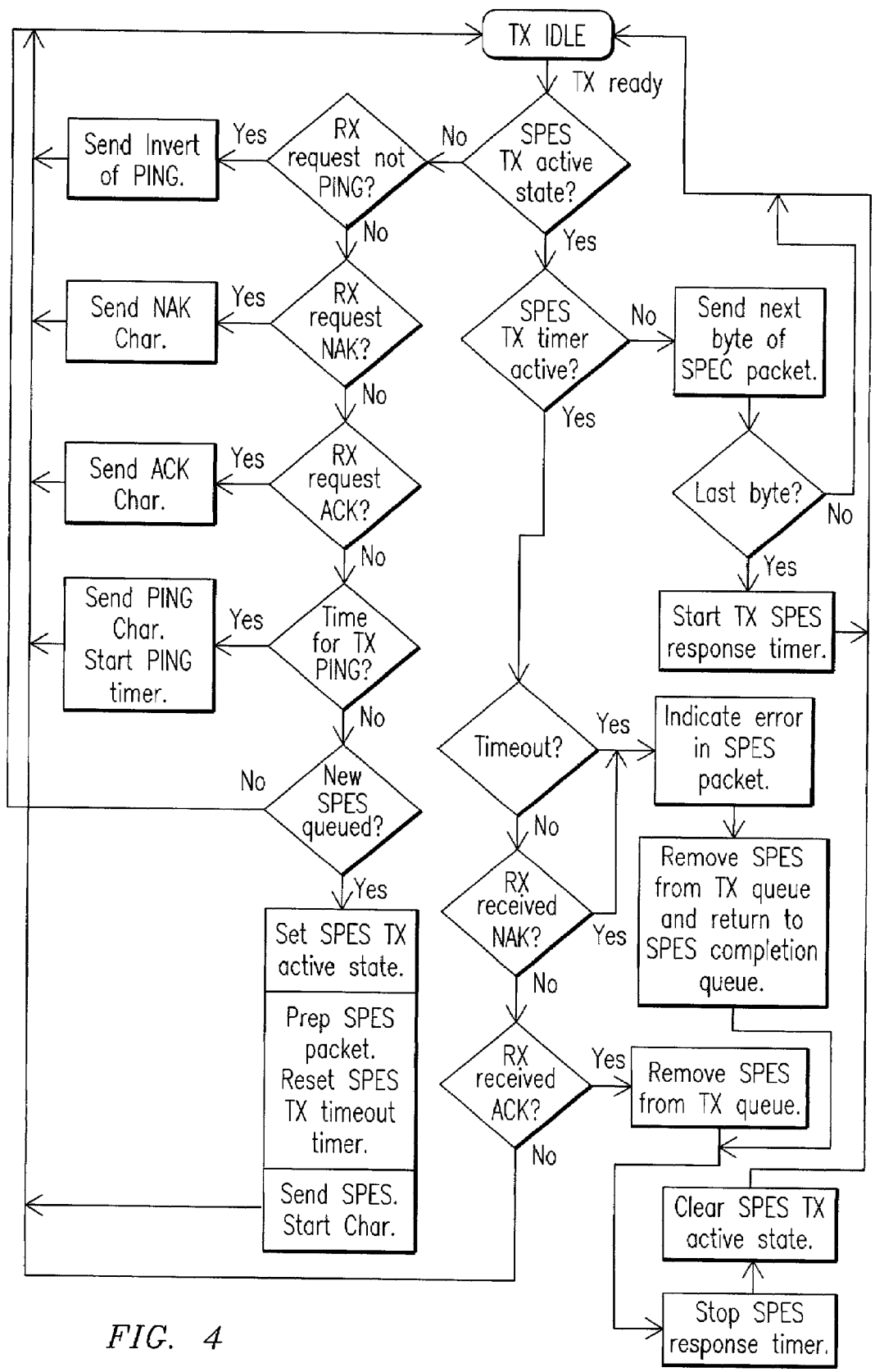

For readers desirous of graphical representations, FIGS. 2–4 represent respective flow charts illustrative of exemplary operational interrelationships regarding the computer bus interface that, in accordance with aspects of the present invention, enables enclosure services in a computer system including a multi-device enclosure. More particularly, the flow chart depicted in FIG. 2 illustrates an exemplary interplay between the host bus adapter and the enclosure processor. FIG. 3 is a flow chart illustrative of receiver operation of either the host bus adapter or the enclosure processor, and FIG. 4 is a flow chart illustrative of transmitter operation of either the host bus adapter or the enclosure processor. The concepts illustrated in the flow charts of FIGS. 2 and 4 are based on the discussion provided in the context of Tables 1–8 above and for the sake of avoiding tiresome repetition to those skilled in the art such discussion will not be repeated.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for enabling enclosure services in a computer system host including a multi-device enclosure having an enclosure processor for monitoring a condition of devices installed in the enclosure, the enclosure processor in communication with a host bus adapter of the computer system host, the method comprising:
    providing a communications port between the multi-device enclosure of the computer system host and the host bus adapter of the computer system host;
    providing a plurality of slots for removably receiving respective devices in the enclosure, with at least one of the devices comprising an Advanced Technology Attachment (ATA)-accessible device; and
    providing respective transceivers for asynchronously interconnecting the enclosure processor and the host bus adapter of the computer system host through the communications port;
    configuring the processor to asynchronously notify the host bus adaptor of the status of any given device of the enclosure upon the occurrence of predefined device events, with at least one of the events being selected from the group consisting of device insertion, device withdrawal, and malfunction indications regarding any of the devices of the multi-device enclosure.

2. The method of claim 1 further comprising configuring the host bus adapter to control, through the communications port, the enclosure processor to set respective device states of the multi-device enclosure.

3. The method of claim 1 further comprising configuring the host bus adapter to generate a set of queries transmitted through the communications port and requiring response from the enclosure processor regarding the status of respective devices of the multi-device enclosure.

4. The method of claim 1 wherein the multi-device enclosure comprises at least one device selected from the group consisting of a storage unit, a temperature sensor, a power supply, and cooling equipment.

5. The method of claim 1 wherein the communications port comprises a serial communications port.

6. The method of claim 1 wherein each transceiver comprises a Universal Asynchronous Receiver Transmitter (UART).

7. A computer bus interface for enabling enclosure services In a computer system host including a multi-device enclosure having an enclosure processor for monitoring a condition of devices installed in the enclosure, the enclosure processor in communication with a host bus adapter of the computer system host and including a plurality of slots for removably receiving respective devices in the enclosure, the interface comprising:
    a communications port between the multi-device enclosure of the computer system host and the host bus adapter of the computer system host;
    at least one of the devices of the multi-device enclosure of the computer system host comprising an Advanced Technology Attachment (ATA)-accessible device; and
    a pair of transceivers for asynchronously interconnecting the enclosure processor and the host bus adapter of the computer system host through the communications port;
    memory including a plurality of instructions for configuring the processor to asynchronously notify the host bus adaptor of the status of any given device of the enclosure upon the occurrence of predefined device events, with at least one of the events being selected from the group consisting of device insertion, device withdrawal, and malfunction indications regarding any of the devices of the multi-device enclosure.

8. The interface of claim 7 wherein the memory further includes instructions for configuring the host bus adapter to control, through the communications port, the enclosure processor to set respective device states of the multi-device enclosure.

9. The interface of claim 7 wherein the memory further includes instructions for configuring the host bus adapter to generate a set of queries transmitted through the communications port and requiring response from the enclosure processor regarding the status of respective devices of the multi-device enclosure.

10. The interface of claim 7 wherein the multi-device enclosure comprises at least one device selected from the group consisting of a storage unit, a temperature sensor, a power supply, and cooling equipment.

11. The interface of claim 7 wherein the communications port comprises a serial communications port.

12. The interface of claim 7 wherein each transceiver comprises a Universal Asynchronous Receiver Transmitter (UART).

13. A computer-readable storage medium including instructions for causing an interface to enable enclosure services in a computer system host including a multi device enclosure having an enclosure processor for monitoring a condition of devices installed in the enclosure, the enclosure processor in communication with a host bus adapter of the computer system host and including a plurality of slots for removably receiving respective devices in the enclosure, with at least one of the devices comprising an Advanced Technology Attachment (ATA)-accessible device, the computer-readable storage medium comprising instructions for:

configuring respective transceivers for asynchronously interconnecting the enclosure processor of the computer system host and a host bus adapter of the computer system host through a communications port; and configuring the processor to asynchronously notify the host bus adaptor of the status of any given device of the enclosure upon the occurrence of predefined device events, with at least one of the events being selected from the group consisting of device insertion, device withdrawal, and malfunction indications regarding any of the devices of the multi-device enclosure.

14. The computer-readable medium of claim 13 further comprising instructions for configuring the host bus adapter to control, through the communications port, the enclosure processor to set respective device states of the multi-device enclosure.

15. The computer-readable medium of claim 13 further comprising instructions for configuring the host bus adapter to generate a set of queries transmitted through the communications port and requiring response from the enclosure processor regarding the status of respective devices of the multi-device enclosure.

16. The computer-readable medium of claim 13 wherein the multi-device enclosure comprises at least one device selected from the group consisting of a storage unit, a temperature sensor, a power supply, and cooling equipment.

17. The computer-readable medium of claim 13 wherein the communications port comprises a serial communications port.

18. The computer-readable medium of claim 13 wherein each transceiver comprises a Universal Asynchronous Receiver Transmitter (UART).

* * * * *